United States Patent [19]

Brenner

[11] Patent Number: 5,760,737
[45] Date of Patent: Jun. 2, 1998

[54] NAVIGATION SYSTEM WITH SOLUTION SEPARATION APPARATUS FOR DETECTING ACCURACY FAILURES

[75] Inventor: Mats A. Brenner, Plymouth, Minn.

[73] Assignee: Honeywell Inc.

[21] Appl. No.: 712,232

[22] Filed: Sep. 11, 1996

[51] Int. Cl.$^6$ .............................. G01S 5/02; H04B 7/185
[52] U.S. Cl. ..................... 342/357; 342/457; 342/464
[58] Field of Search ............................. 342/357, 450, 342/457, 464; 364/449.7, 449

[56] References Cited

U.S. PATENT DOCUMENTS

| | | | |
|---|---|---|---|
| 4,652,884 | 3/1987 | Starker | 342/357 |
| 4,903,212 | 2/1990 | Yokouchi et al. | 364/449 |
| 4,954,833 | 9/1990 | Evans et al. | 342/357 |
| 5,184,304 | 2/1993 | Huddle | 364/453 |
| 5,216,611 | 6/1993 | McElreath | 364/454 |
| 5,317,514 | 5/1994 | Bancroft et al. | 364/449 |
| 5,390,124 | 2/1995 | Kyrtsos | 364/449 |
| 5,390,125 | 2/1995 | Sennott et al. | 364/449 |
| 5,430,657 | 7/1995 | Kyrtsos | 364/459 |
| 5,436,632 | 7/1995 | Sheynblat | 342/357 |
| 5,486,834 | 1/1996 | Lennen | 342/357 |
| 5,504,492 | 4/1996 | Class et al. | 342/357 |
| 5,512,903 | 4/1996 | Schmidtke | 312/357 |
| 5,523,761 | 6/1996 | Gildea | 342/357 |

OTHER PUBLICATIONS

Article entitled "Kalman Filtering: Theory and Application", Edited by Harold W. Sorenson published by IEEE Press of New York, pp. 1–3.

Article entitled "Implementation of a RAIM Monitor is a GPS Receiver and an Integrated GPS/IR" by Mats Brenner of Honeywell Commercial Flight Systems, Coon Rapids, MN.

Article entitled "A New Approach to GPS Integrity/Availability: Immediate Global Sole Means Without WAAS" by Dr. John Diesel of Litton Aero Products, pp. 567–576.

Article entitled "NAVSTAR Global Positioning Systems" by Col. James Reynolds/2Lt. Thomas McCabe of the U.S. Air Force Space Division, pp. 21.1.1–21.1.6.

Article entitled "Least-Squares Estimation: From Gauss to Kalman" by H. W. Sorenson of the University of California, San Diego. Reprinted from IEEE Spectrum, vol. 7(Jul. 1970), pp. 7–15.

Article entitled "Integrated Aircraft Navigation" by James L. Farrell of Westinghouse Systems Development Division, Baltimore, MD; published by Academic Press, New York, San Francisco, London 1976, pp. 154–189 and Appendix II, pp. 320–331.

(List continued on next page.)

Primary Examiner—Thomas H. Tarcza
Assistant Examiner—Dao L. Phan
Attorney, Agent, or Firm—Charles J. Ungemach

[57] ABSTRACT

A navigation system, incorporating a unique method for detecting failures and determining an accuracy or error bound, has a receiver for receiving signals from several remote transmitters and a processor for determining a position solution from the signals. The processor, preferably employing Kalman filtering techniques, also determines several position subsolutions from subsets of the signals. The processor then computes covariance-based solution separation parameters based on statistical worst-case differences, or separations, between the position solution and the subsolutions. Similarly, the processor also computes error parameters defining statistical worst-case errors in each position subsolution. With the solution separation and the subsolution error parameters, the processor determines an error bound for the position solution. The processor also uses the separation parameters as detection thresholds for detecting transmitter failures. In one embodiment, the processor incorporates inertial reference data into the solutions and ultimately into the error bound calculation, thereby improving the ability of the navigation system to monitor its own accuracy, or integrity.

43 Claims, 5 Drawing Sheets

OTHER PUBLICATIONS

Article entitled "Time Dissemination Using NAVSTAR Global Positioning System (GPS) Phase IIB User Equipment" by M. D. Yakos and E. H. Hirt of Rockwell International/Collins Divisions, Cedar Rapids, IA, published in Proc. 35th Ann. Freq. Control Symposium, USAERADCOM, Ft. Monmouth, NJ, (May 1981), pp. 537–544.

Article entitled "Multiconfiguration Kalman Filter Design for High–Performance GPS Navigation" by Min H. Kao and Donald H. Eller; published by IEEE (1983), pp. 304–314.

Article entitled "The Discrete Kalman Filter", Chapter 5 From Introduction To Random Signals and Applied Kalman Filtering (Second Edition) by Robert Grover Brown and Patrick Y. C. Hwang of Rockwell International Corporation, published by John Wiley & Sons, Inc. New York, Chichester, Brisbane, Toronto, Singapore (1992), pp. 210–253.

Article entitled "Linearization and Additional Topics on Applied Kalman Filtering", Chapter 9 from Introduction to Random Signals and Applied Kalman Filtering (Second Edition) by Robert Grover Brown and Patrick Y. C. Hwang of Rockwell International Corporation, published by John Wiley & Sons, Inc. New York, Chichester, Brisbane, Toronto, Singapore (1992), pp. 356–409.

Article entitled "The Global Positioning System: A Case Study", Chapter 10 from Introduction to Random Signals and Applied Kalman Filtering (Second Edition) by Robert Grover Brown and Patrick Y. C. Hwang of Rockwell International Corporation, published by John Wiley & Sons, Inc. New York, Chichester, Brisbane of Toronto, Singapore (1992), pps. 409–455.

Article entitled "A Baseline GPS RAIM Scheme and a Note on the Equivalence of Three RAIM Methods" by R. Grover Brown of Iowa State University, Ames, IA, received Jan. 1992 and revised Apr. 1992; published by Navigation: Journal of the Institute of Navigation, vol. 39, No. 3, Fall 1992, pp. 301–316.

Paper entitled "Assessment of RAIM FDI Availability Using ARP Method of Screening Out Bad Geometrics" by R. Grover Brown (Volpe Center), Gerald Y. Chin (Volpe Center), U.S. Department of Transportation (Cambridge MA), presented to RTCA SC–159, WG–5, (May, 1993), RTCA paper No. 213–93/SC159–436.

Paper entitled "GPS/IRS AIME: Calculation of Thresholds and Protection Radius Using Chi–Square Methods" by Dr. John W. Diesel (Litton Aero Products) and Sherry V. Luu (Litton Aero Products) from the ION GPS–95 Meeting, Sep. 12–15, 1995, Session Date: Sep. 15, 1995.

Paper entitled "Fault Detection and Exclusion Performance Using GPS and GLONASS" by Karen Van Dyke (DOT/Volpe Center) presented at the 1995 National Technical Meeting, Jan. 18–20, 1995, Session B2, Session Date Jan. 19, 1995.

Article entitled "Self–Contained GPS Integrity Check Using Maximum Solution Separation" by R. Gover Brown and Paul W. McBurney of Iowa State University, Ames, Iowa, received Sep. 1987 and revised Jan. 1988, published by Navigation: Journal of the Institute of Navigation, vol. 35, No. 1, Spring 1988, pp. 41–53.

NAVIGATION SYSTEM WITH SOLUTION SEPARATION APPARATUS FOR DETECTING ACCURACY FAILURES

BACKGROUND OF THE INVENTION

The present invention concerns the problem of detecting accuracy-related failures in radio navigation systems, particularly global positioning systems.

A global positioning system measures the three-dimensional, global position of a user set, using the distances between the user set and a number of earth-orbiting satellite transmitters. The user set, usually mounted to a vehicle, includes a receiver for receiving signals from the satellite transmitters. Each signal indicates both the position of its transmitter and its transmission time, enabling the receiver, equipped with its own clock, to approximate signal transit times and to estimate the distances to the transmitters. A processor in the user set uses at least four of the distances, known as pseudoranges, to accurately approximate the position of the user set.

The accuracy of the approximate position, or position solution, varies as changing atmospheric conditions affect signal-to-noise ratios and signal transit times. The accuracy also varies as the orbiting satellites occasionally experience protracted failures during which they continue to operate while providing erroneous or extra-noisy signals. Moreover, some satellite transmitters include random accuracy-degradation schemes to prevent unauthorized user sets from attaining the same accuracy as authorized user sets. These and other factors appear as random noise in the transmitted signals, random errors in the computed pseudoranges, and ultimately as a random error in the position solution itself.

In view of the varying accuracy, many global positioning systems, particularly those for aircraft navigation, include a subsystem for detecting accuracy faults, or failures. The subsystem, known as a receiver autonomous integrity monitor (RAIM), determines a statistical worst-case error for the position solution and compares it to a standard, called an alarm limit, which defines a maximum allowable radial error for the global positioning system. If the worst-case error exceeds the maximum allowable error, the integrity monitor detects a failure and triggers an alarm, alerting a pilot or flight management system that accuracy, or integrity, of the position solution is unacceptable.

The worst-case error, due to an undetected failure in a satellite, typically defines the radius of a horizontal circle centered on the receiver antenna, though it may also define a sphere or the height of a vertical boundary. The worst-case error (also known as an error bound, integrity limit, or protection limit) depends not only on the random noise in the pseudoranges but also on preset probabilities of missed and false detections.

In estimating the protection limit, the integrity monitor typically implements one of the following methods: the least squares residual method, the parity vector method, or the range comparison method. For a summary of these methods, see R. Grover Brown, A Baseline GPS RAIM Scheme and a Note on the Equivalence of Three RAIM Methods, Navigation: Journal of the Institute of Navigation, Vol. 39, No. 3, Fall 1992. Although the methods follow different approaches to determining the protection limit, they suffer from a common problem, known as integrity holes.

The integrity hole problem stems from the reliance on redundant pseudorange data to calculate the protection limit. Usually, the number of satellites in range, or view, of the user set exceeds the minimum four required to generate a position solution, with the extra satellites providing unnecessary, or redundant, pseudoranges. The methods essentially use the extra pseudoranges to calculate and compare different position solutions for consistency. Thus, when the number of satellite transmitters falls below five, the minimum number to establish redundancy, integrity monitors employing these methods are incapable of monitoring accuracy and detecting faults.

Moreover, for reliable operation in the presence of noise, these known methods further require the five satellites to satisfy certain geometric constraints, that is, to have certain angular relationships, or lines of sight, with the user set. This means that, even with five satellites available, integrity monitors cannot always detect failures in accuracy. In short, because of the limits of known methods, conventional integrity monitors are subject to intermittent outages, or integrity holes, which blind the integrity monitor to potentially dangerous failures in navigational accuracy.

Accordingly, to promote the reliability and safety of radio navigation systems, specifically global positioning systems, there is a need for an improved integrity monitor which reduces or eliminates the occurrence of integrity holes.

SUMMARY OF THE INVENTION

To address this need, the present invention provides a navigation system that incorporates a unique method for detecting system failures and determining a statistical protection limit, or error bound, of its position solution.

In a first embodiment, the navigation system includes a receiver for receiving signals from several remote transmitters and a processor for determining the position solution and several position subsolutions for a vehicle. The processor derives the position solution from pseudoranges, based on all the signals, and the position subsolutions from respective subsets of the pseudoranges. It then computes the error bound from a solution separation parameter and also preferably a subsolution error parameter. The solution separation parameter stems from statistics of a separation between the position solution and one of the subsolutions, and the subsolution error parameter stems from error statistics of one of the subsolutions.

This first embodiment is compatible with snap-shot techniques, such as the parity vector method, yet is also extendable to filter-based techniques, such as Kalman filtering. Kalman filtering enables the processor to not only incorporate inertial data but also past and present signal values, as shown in a second embodiment.

In the second embodiment, the navigation system further includes inertial sensors for providing vehicle motion data to the processor. And, the processor employs Kalman filters to determine the position solution, subsolutions, and error bound, from the motion data as well as past and present values of the signals. The processor preferably derives the solution separation parameter from a covariance matrix, which describes the statistics of the separation between one subsolution and the position solution. Likewise, the error parameter preferably stems from another covariance matrix, which describes the statistics of noise-induced errors in one of the subsolutions. The sensors preferably include accelerometers for providing acceleration data, gyroscopes for providing attitude data, and an altimeter for providing altitude data.

Adding motion data to the error bound calculation further reduces the occurrence of integrity holes, because the processor can compute the error bound during brief periods when there is insufficient data for computing the position solution. In a sense, the Kalman filters and the motion data enable the processor to build up "momentum" for coasting through integrity holes.

Another facet of the present invention entails using one of the solution separation parameter as a detection threshold for detecting transmitter failures. Preferably, the processor computes a discriminator corresponding to the actual horizontal distance between the position solution and a position subsolution. If the discriminator exceeds the solution separation parameter, the processor sets a flag indicating a failure detection.

DETAILED DESCRIPTION OF THE PREFERRED EMBODIMENTS

The present invention, generally applicable to any measurement system and particularly applicable to radio navigation systems, has two embodiments, each incorporating a unique covariance-based solution-separation method of detecting transmitter failures and determining the protection limit of a position solution. The first embodiment relies on a general form of the method, and the second extends the general form to a Kalman filter implementation that incorporates an inertial reference unit.

First Embodiment

Figure 1:
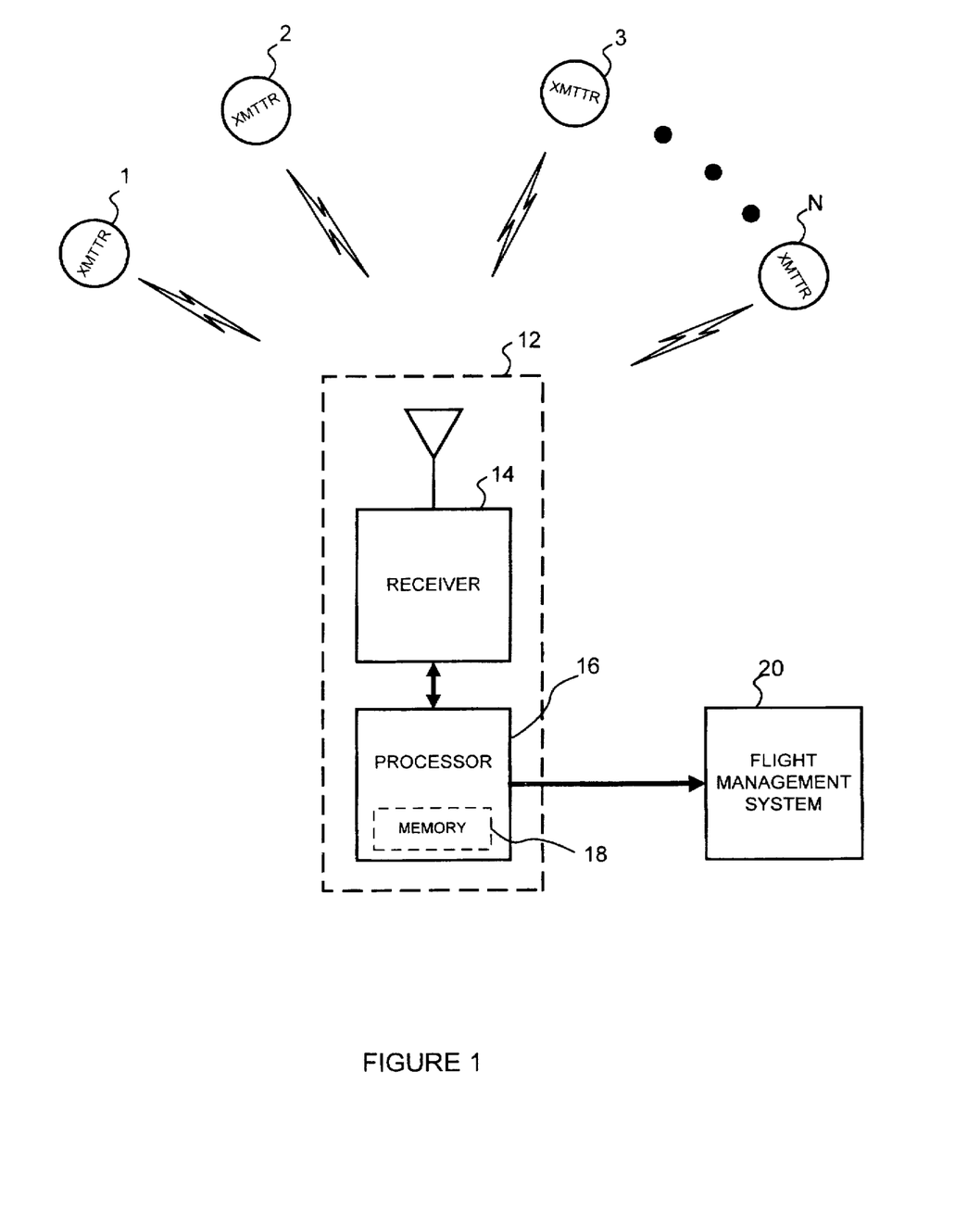
FIG. 1 shows a navigation system incorporating the present invention.

FIG. 1 shows a radio navigation system 10 incorporating the teachings of the present invention. The system includes several transmitters 1-N and user set 12. Transmitters 1-N, in the preferred embodiment, are a subset of the NAVSTAR GPS constellation of satellite transmitters, with each transmitter visible from the antenna of user set 12. Transmitters 1-N broadcast N respective signals indicating respective transmitter positions and signal transmission times to user set 12.

User set 12, mounted to an aircraft (not shown), includes receiver 14, processor 16, and processor memory 18. Receiver 14, preferably NAVSTAR GPS compatible, receives the signals, extracts the position and time data, and provides pseudorange measurements to processor 16. From the pseudorange measurements, processor 16 derives a position solution for the user set. Although the satellites transmit their positions in World Geodetic System of 1984 (WGS-84) coordinates, a Cartesian earth-centered earth-fixed system, the preferred embodiment determines the position solution in a local reference frame L, which is level with the north-east coordinate plane and tangential to the Earth. This frame choice, however, is not critical, since it is well-understood how to transform coordinates from one frame to another.

Processor 16 also uses the pseudorange measurements to detect satellite transmitter failures and to determine a worst-case error, or protection limit, both of which it outputs with the position solution to flight management system 20. Flight management system 20 compares the protection limit to an alarm limit corresponding to a particular aircraft flight phase. For example, during a pre-landing flight phase, such as nonprecision approach, the alarm limit (or allowable radial error) is 0.3 nautical miles, but during a less-demanding oceanic flight phase, the alarm limit is 2–10 nautical miles. (For more details on these limits, see RTCA publication DO-208, which is incorporated herein by reference.) If the protection limit exceeds the alarm limit, the flight management system, or its equivalent, announces or signals an integrity failure to a navigational display in the cockpit of the aircraft. The processor also signals whether it has detected any satellite transmitter failures.

Figure 2:
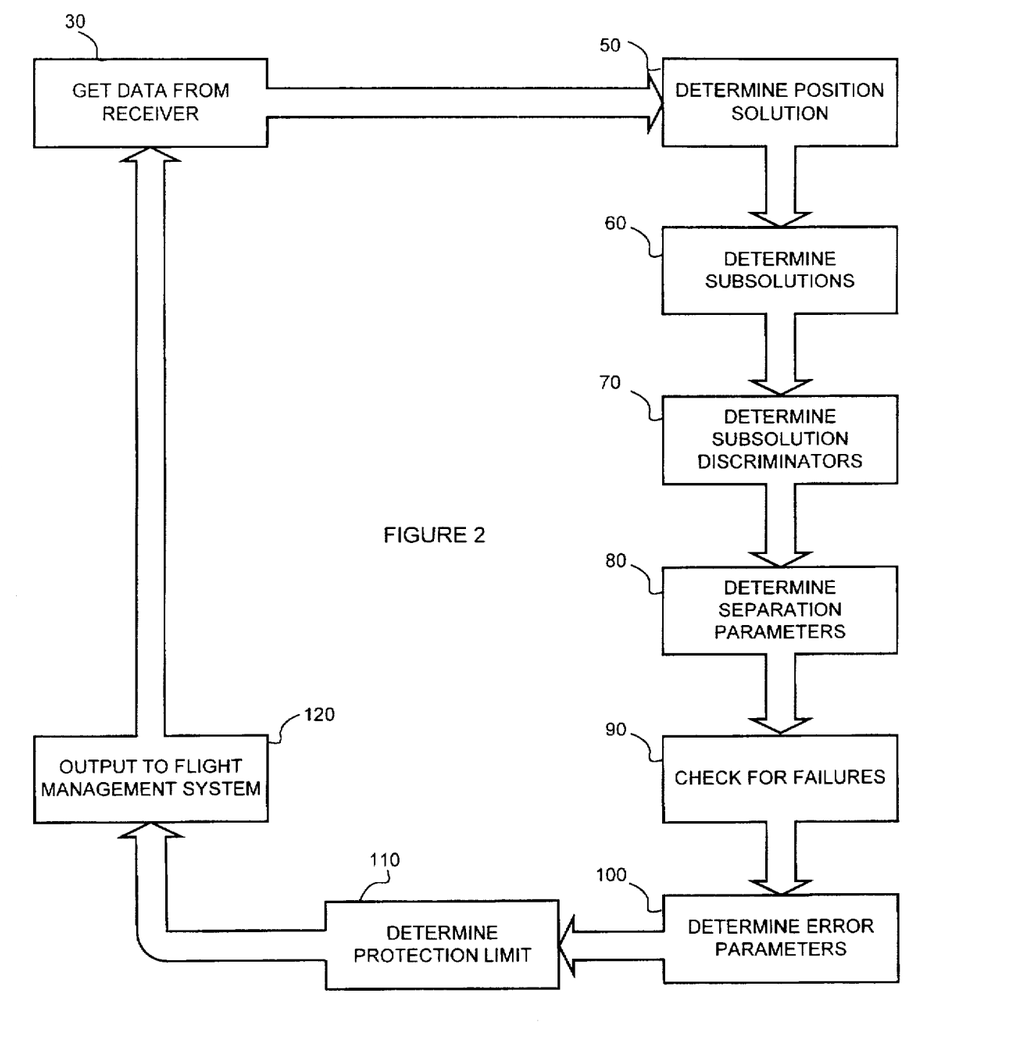
FIG. 2 shows a first method of operating the navigation system of FIG. 1.

FIG. 2 shows more details about the operation of the navigation system of FIG. 1, with particular emphasis on the activity of processor 16. Normal operation begins with the processor obtaining pseudorange measurements from receiver 14, in step 30. In this step, the processor also determines the number of satellite transmitters N, which ordinarily varies as satellites move in and out of view of receiver 14 and also as satellites fail or otherwise become unavailable. (In the preferred embodiment N also depends on whether the processor masks certain satellites.)

After determining the number N, the processor forms an N-element vector $\rho_{meas}$ which contains the pseudoranges measurements. The process then "linearizes" the non-linear equations governing the position solution around an initial estimate of the position solution and an initial receiver clock offset estimate. This requires defining $\Delta\rho_{meas}$, an N-element vector of pseudorange residuals, according to $$\Delta\rho_{meas} = \rho_{meas} - \rho_{est} \tag{1}$$

where $\rho_{meas}$ is the N-element column vector of measured pseudoranges and $\rho_{est}$ is an N-element vector of the estimated pseudoranges derived from the initial position estimate and the initial clock offset estimate. Thus, the estimated pseudoranges are those that would yield the initial position estimate.

In step 50, the processor determines a full position solution $\Delta r_0$, using pseudorange residuals derived from the N signals. The processor may use any technique for solving a system of overdetermined algebraic equations, such as least-squares estimation. "Overdetermined" refers to the presence of redundant pseudoranges. The solution $\Delta r_0$, defined as the full solution because it incorporates the N pseudorange residuals, is defined as $$\Delta r_0 = S_0 \Delta\rho_{meas} \tag{2}$$

where $S_0$ is a 4×N least-squares solution matrix.

Step 60 entails calculating several subsolutions $\Delta r_1$, $\Delta r_2$, . . . $\Delta r_N$, each based on a respective subset of the N pseudorange measurements. In the preferred embodiment, each subset includes only N–1 pseudorange measurements, with the n-th subset excluding the n-th pseudorange measurement. Thus, the n-th subsolution includes all but the n-th pseudorange measurement, which stems from the signal of the n-th satellite transmitter. The preference for excluding one measurement stems from the low likelihood that more than one GPS NAVSTAR transmitter will ever fail or otherwise present an abnormal measurement situation to the user set. Similar to the full solution $\Delta r_0$, the n-th subsolution is defined as $$\Delta r_n = S_n \Delta\rho_{meas} \tag{3}$$

where $S_n$ is a 4×N least-square subsolution matrix with a zero n-th column. Thus, multiplying $S_n$ and the full $\Delta\rho_{meas}$ excludes the n-th pseudorange measurement.

In the preferred embodiment, the full solution $\Delta r_0$ and the subsolutions $\Delta r_1-\Delta r_N$ are 4-element vector quantities with three elements representing respective north, east, and down coordinates and a fourth element $c\Delta t$ representing the distance related to the receiver clock offset, where c is the speed of light, and $\Delta t$ is the receiver clock offset. The center of the north-east-down (NED) frame is the initial position estimate. Thus, the three NED coordinates actually represent a position relative the initial position estimate because of the linearization of the governing equations around the initial estimate. Hence, to obtain an absolute position solution, the NED coordinates must be added to the corresponding coordinates of the initial position estimate. However, as used herein, position solution broadly connotes any relative position or absolute position solution.

In step 70, the processor computes discriminators $d_1-d_N$ for the respective subsolutions $\Delta r_1-\Delta r_N$. The discriminator $d_n$ may be any mathematical quantity based on a mathematical distance or separation between the n-th subsolution $\Delta r_n$ and full solution $\Delta r_0$. The preferred embodiment defines discriminators $d_1-d_N$ as the actual horizontal distance between the full solution $\Delta r_0$ and respective subsolutions $\Delta r_1-\Delta r_N$. In the horizontal, or north-east coordinate, plane, the distance $d_n$ between subsolution $\Delta r_n$ and full solution $\Delta r_0$ is $$d_n = \sqrt{(\Delta r_0(N) - \Delta r_n(N))^2 + (\Delta r_0(E) - \Delta r_n(E))^2} \quad (4)$$

where (N) and (E) denote the north and east components of the full solution and the n-th subsolution. The subsolutions are linearized around the same initial estimate as the full solution.

Figure 2A:
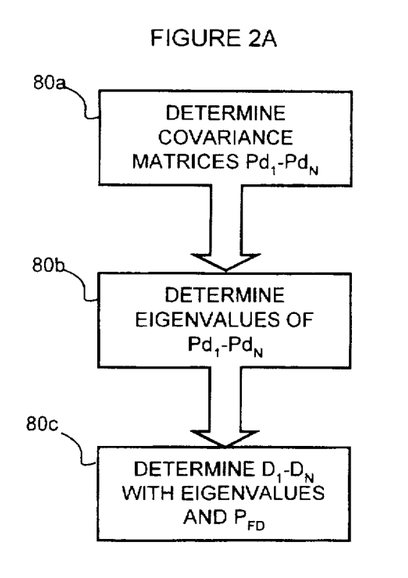
FIG. 2A shows details of step 70 of FIG. 2.

In step 80, processor 16 computes a set of solution separation parameters, $D_1-D_N$, based on the separation statistics of the full solution from the respective subsolutions. Computing the solution separation parameters entails substeps 80a, 80b, and 80c, which are shown in FIG. 2A.

Step 80a requires computing covariance matrices $dP_1-dP_N$, which describe the statistics of the respective separations between the full solution $\Delta r_0$ and subsolutions $\Delta r_1-\Delta r_n$. The n-th covariance matrix $dP_n$ is defined as $$dP_n = E[(\Delta r_0 - \Delta r_n)(\Delta r_0 - \Delta r_n)^T] \quad (5)$$

where E denotes expectation and superscript T denotes transposition. In the preferred implementation, processor 16 computes the covariance matrices, using the equivalent relation $$dP_n = (S_0 - S_n)\sigma^2_{pr}(S_0 - S_n)^T \quad (6)$$

where $\sigma^2_{pr}$ is the variance of the pseudorange measurements.

The preferred implementation assumes the measurements include zero-mean Gaussian noise with variance $\sigma^2_{pr}$, meaning that the separation also has Gaussian statistics. These statistics define an multi-dimensional ellipsoid, which in the horizontal (north-east) plane confines all possible horizontal separations between $\Delta r_0$ and $\Delta r_n$ to an elliptical region encompassing the n-th subsolution. Each point within the region corresponds to a different possible separation, with the full position solution in the center corresponding to zero separation and the maximum separation at the either end.

In step 80b, the processor determines the position-domain eigenvalues of covariance matrices $dP_1-dP_N$. These eigenvalues determine the size of the elliptical regions, since they control how far the separations stray from the middle of the ellipse. In other words, the eigenvalues determine the statistics of separation between the full solution and each subsolution. However, because of the directional character of the two-dimensional elliptical distributions, the maximum eigenvalue $\lambda_{dPnmx}$ of each covariance matrix determines the maximum separation variance.

Thus, step 80c processor 16 uses the maximum eigenvalues $\lambda_{dP1mx}-\lambda_{dPNmx}$ to determine the maximum separations, or solution separation parameters $(D_1-D_N)$, according to $$D_n = \sqrt{\lambda_{dP_n mx}} \; Q^{-1}\left(\frac{P_{FD}}{2N}\right) \quad (7)$$

where $Q^{-1}$ denotes the inverse of $$Q(x) = \frac{1}{\sqrt{2\pi}} \int_x^\infty e^{-\frac{t^2}{2}} dt \quad (8)$$

the well-known normalized cumulative distribution function. $P_{FD}$ is a given probability of false detection for the integrity monitor. In this definition of the separation parameter, the factor two accounts for both sides of the elliptical distribution and the factor N accounts for the possibility of any one of the N subsolutions causing a false detection.

Having determined the solution separation parameters, processor 16 executes step 90 which entails comparing the actual separations $d_1-d_N$ to respective solution separation parameters $D_1-D_N$. The solution separation parameters $D_1-D_N$ function as failure detection thresholds for the individual subsolutions. Thus, if the actual separation $d_n$ between subsolution $\Delta r_n$ and the full solution $\Delta r_0$ exceeds its respective separation parameter $D_n$, the processor sets a failure flag indicating detection of a satellite transmitter failure.

Figure 2B:
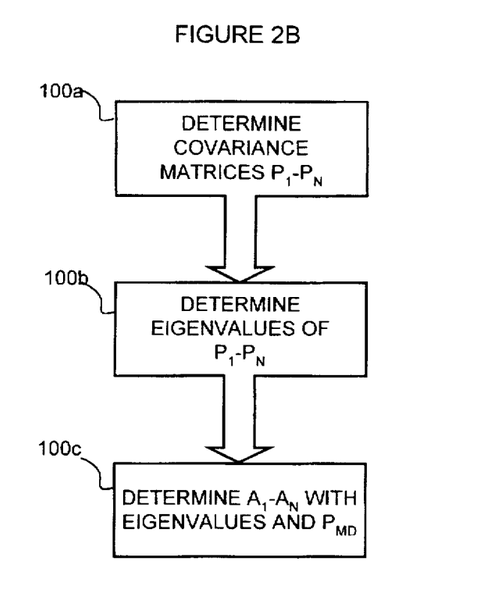
FIG. 2B shows details of step 80 of FIG. 2.

Step 100 requires determining error parameters, $A_1-A_N$, based on the noise-induced errors in respective subsolutions $\Delta r_1-\Delta r_N$. The noise-induced errors force each subsolution away from the actual position of user set 12. Step 100 comprises three substeps 100a, 100b, and 100c, which are shown in FIG. 2B.

In step 100a, processor 16 calculates error covariance matrices $P_1-P_N$ describing the statistics of the noise-induced errors for corresponding subsolutions $\Delta r_1-\Delta r_N$. The n-th error covariance matrix $P_n$ is $$P_n = E[\delta r_n \delta r_n^T] \quad (9)$$

where $\delta r_n$ represents the effect of noise on the n-th subsolution. $\delta r_n$ is $$\delta r_n = S_n w, \quad (10)$$

where w is the N-dimensional measurement noise vector and $E[ww^T]$ is $\sigma^2_{pr}$. In the preferred embodiment, processor 16 calculates matrices $P_1-P_N$ from $$P_n = S_n \sigma_{pr}^2 S_n^T \quad (11)$$

Again, the preferred implementation assumes the errors are zero-mean with Gaussian distribution. Thus, like the solution separations, the subsolution errors are confined to corresponding elliptical regions in the north-east coordinate plane. Each point within the region corresponds to a different possible error, with the center corresponding to zero error and the maximum error at either end.

In step 100b, the processor determines the eigenvalues of error covariance matrices $P_1-P_N$. The eigenvalues define the variance, that is, the spread of the errors around the average error, and thus control the magnitude of the maximum error between the n-th subsolution $\Delta r_n$ and the actual position. The preferred embodiment uses the maximum eigenvalue to approximate this variance. Thus, the maximum error for the n-th subsolution $\Delta r_n$ depends on the square root of the maximum eigenvalue $\lambda_{nmx}$ of $P_n$, the corresponding error covariance matrix.

In step 100c, the processor computes error parameters $A_1$–$A_N$ using $$A_n = \sqrt{\lambda_{nmx}} \ Q^{-1}(P_{MD}) \qquad (12)$$

where $P_{MD}$ is a given probability of missed detection.

Figure 2C:
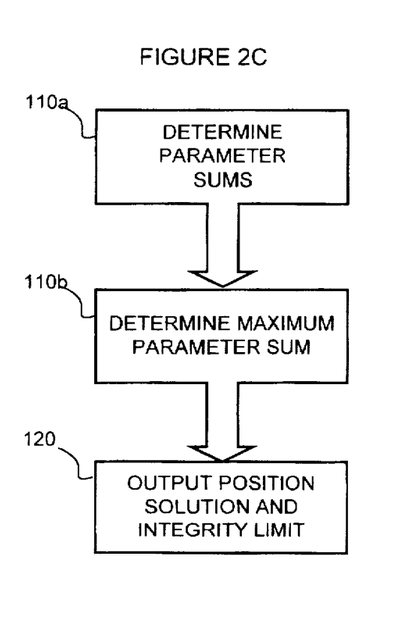
FIG. 2C shows details of step 90 of FIG. 2.

In FIG. 2, the next step is step 110. In this step, the processor determines the protection limit, or error bound, using the solution separation parameters $D_1$–$D_N$ and the subsolution error parameters $A_1$–$A_N$. This preferably entails determining the maximum sum of $D_n$ and $A_n$, over all the parameters $D_1$–$D_N$ and $A_1$–$A_N$. FIG. 2C shows this as two steps: step 110a determines N parameters sums $(D_1+A_1)$–$(D_N+A_N)$, and step 110b selects the maximum of these parameter sums as the protection limit, or error bound. Functionally, this is expressed as $$\text{Protection Limit} = \max\{D_n + A_n\} \text{ over } n=1, N \qquad (13)$$

This relation follows from understanding that $D_n$ and $A_n$ may, and in fact are likely to, act in the different directions, and that the scalar sum of $D_n$ and $A_n$ therefore defines an upper bound for the protection limit of the full position solution.

After calculating the integrity limit, processor 16 executes step 120 by outputting the full position solution, the protection limit, and the failure flag to flight management system 20. The failure flag indicates the validity of the computed protection limit. Specifically, if the failure flag is true, indicating a satellite transmitter failure, the computed protection limit is invalid. However, if the flag is false, the protection limit is valid and represents a true bound on the error of the position solution. After executing this output step, the processor returns to step 30 to get new data from the receiver and to generate a new position solution, protection limit, and failure flag.

In sum, the first embodiment applies a unique solution-separation technique for detecting satellite failures and for determining the protection limit of a position solution. Although the first embodiment explicitly operates only on present measurement data, in so-called "snapshot" fashion, its chief advantage is its unique suitability for Kalman filter implementations. Through the use of Kalman filters, the processor incorporates not only present measurement data, but also past measurement data into the integrity monitoring process. Moreover, Kalman filters enable the processor to incorporate inertial sensor data into the determination of satellite transmitter failures and the calculation of the position solution and the protection limit, as evidenced in the second embodiment.

Second Embodiment

Figure 3:
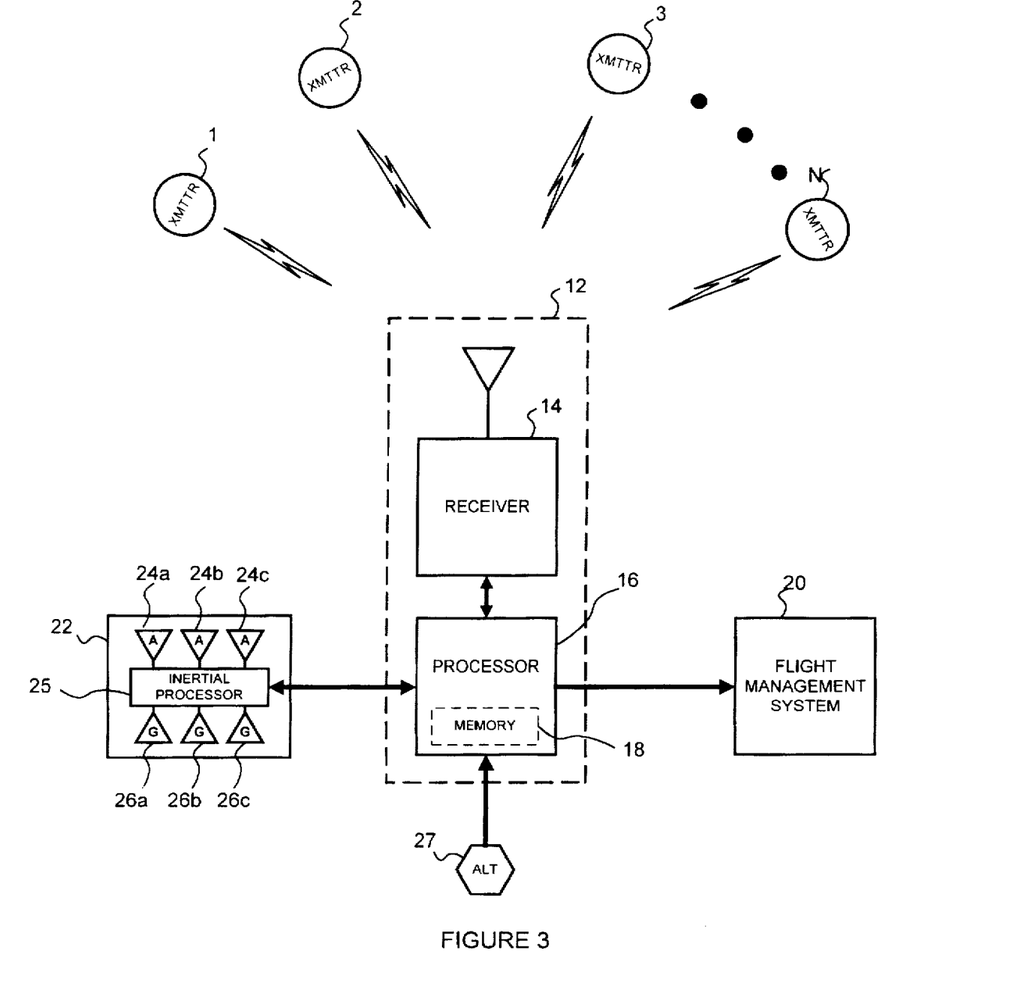
FIG. 3 shows another navigation system incorporating the present invention.

As shown in FIG. 3, the second embodiment extends the radio navigation system of FIG. 1 with the addition of inertial reference unit 22 for providing inertial data to processor 16 and pressure altitude sensor 27 for providing altitude data to processor 16. The resulting combination constitutes a hybrid navigation system. (Altitude sensor 27 also provides data to to stabilize inertial reference unit, as known in the art, but for clarity the connection is not shown here.)

Inertial reference unit 22, mounted to the aircraft (not shown), preferably includes three accelerometers 24a–24c for measuring acceleration in three dimensions and three gyroscopes 26a–26c for measuring angular orientation, or attitude, relative a reference plane. Inertial reference unit 22 also includes inertial processor 25 which determines an inertial position solution $r_i$, preferably a three-element vector in an earth-fixed reference frame. Inertial processor 26 also preferably converts the acceleration data into raw acceleration vector $a_{raw}$ and attitude data into raw angular velocity vector $\omega_{raw}$. The preferred angular velocity vector defines the rotation of the body frame (fixed to the aircraft) in three dimensions, and the preferred inertial acceleration defines the three components of acceleration in body frame coordinates. Inertial processor 26 also determines a transformation matrix C for transforming body frame coordinates to local vertical frame L, a three-element rotation vector $\omega_{IE}$ which describes rotation of the earth-based frame E versus inertial frame I transformed to L frame, and rotation vector $\omega_{EL}$ which describes rotation of the L frame versus the earth-fixed frame E transformed to L frame. The details of this inertial processing are well known in the art.

The focal point of the Kalman filter implementation are the hybrid state vectors $\Delta X_0$–$\Delta X_N$, with each having 18 error states and stemming from the exclusion of the n-th satellite transmitter. In other words, $\Delta X_0$ excludes no satellite transmitters and $\Delta X_n$ excludes the n-th satellite transmitter. More specifically, the n-th state vector $\Delta X_n$ is defined as $$\Delta X_n^T = [\psi, \Delta v, \Delta r, \Delta rtc, \Delta vfc, \Delta \omega_0, \Delta a_0, \Delta alt b] \qquad (14)$$

where $\psi \underline{\Delta}$ Three-element attitude error vector;

$\Delta v \underline{\Delta}$ Three-element velocity error vector;

$\Delta r \underline{\Delta}$ Three-element hybrid position solution excluding n-th pseudorange measurement;

$\Delta rtc \underline{\Delta}$ One-element receiver clock phase error expressed as a distance (analogous to $c\Delta t$ in first embodiment);

$\Delta vfc \underline{\Delta}$ One-element receiver clock frequency error expressed as a velocity;

$\Delta \omega_0 \underline{\Delta}$ Three-element vector of gyro biases modeled as first-order Markov processes with 100 hour-time constant;

$\Delta a_0 \underline{\Delta}$ Three-element vector of accelerometer biases modeled as first-order Markov processes with 100-hour time constant; and $\Delta alt_b \underline{\Delta}$ One-element pressure altitude bias.

(For clarity, the "n" subscripts are not shown on each state variable in $\Delta X_n$.) Thus, hybrid state vector $\Delta X_0$–$\Delta X_N$ include respective position solutions $\Delta r_0$–$\Delta r_n$, where the subscript again defines the excluded measurement data. Note that $\Delta r$ in the this embodiment includes only three spatial components, whereas in the first embodiment, it included three spatial components and $c\Delta t$, the distance associated with the receiver clock offset. The state vector $\Delta x$ identifies this variable as $\Delta rtc$.

The state variables are preferably ordered as shown; however, other sequences are equally feasible. Moreover, it is possible to extend this 18 state vector to 30 states by adding states representative of the bias part of selective ability (SA), the accuracy degradation scheme which prevents unauthorized users of NAVSTAR GPS satellites from attaining the same accuracy as authorized users. A sufficient time step between measurements ensures that the SA noise is decorrelated.

Figure 4:
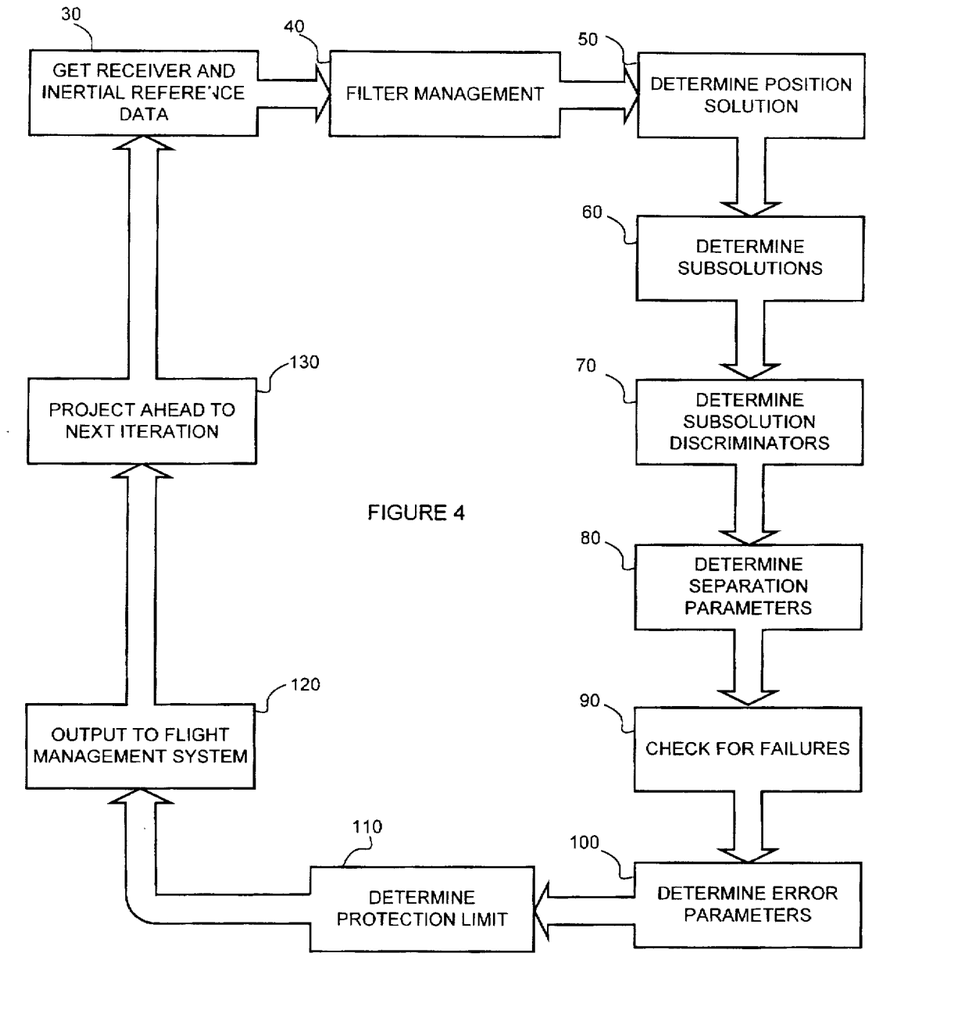
FIG. 4 shows a method of operating the navigation system of FIG. 3, which is similar to the first method shown in FIG. 2.

FIG. 4 illustrates the important operative aspects of the hybrid navigation system, which parallel those of FIGS. 2 and 2A–2C. This process loop preferably operates such that there are two minutes between each iteration.

The method begins in step 30 when the processor retrieves the following inertial data from inertial reference unit 22:

inertial position solution $r_i$,
raw acceleration vector $a_{raw}$,
raw angular velocity vector $\omega_{raw}$,
transformation matrix C,
rotation vector $\omega_{IE}$, and
rotation vector $\omega_{EL}$.

After retrieving this inertial data, the processor models the inertial error dynamics based on motion of the aircraft. This occurs within the context of a linearized inertial error model, which is referenced to local vertical coordinate frame L. This inertial error model defines an attitude error vector $\psi$, a velocity error vector $\Delta v$, and a hybrid position solution $\Delta r$, each stemming from the solution of the following three differential equations:

$$\dot\psi = C\Delta\omega_{IB} + \psi\times(\omega_{IE}+\omega_{EL}) \tag{15}$$

$$\Delta\dot v = \psi\times Ca_{raw} + C\Delta a_{IB} + (2\omega_{IE}+\omega_{EL})\times\Delta v + G\Delta r + \Delta g \tag{16}$$

$$\Delta\dot r = \Delta v + \omega_{EL}\times\Delta r \tag{17}$$

where $\Delta\omega_0 \triangleq$ Gyro biases modelled as first order Markov processes with a 100 hour time constant;

$\Delta\omega_{IB} \triangleq \Delta\alpha\omega_0$+scale factor and misalignment errors;

$\Delta a_0 \triangleq$ Accelerometer biases modelled as first order Markov processes with a 100 hour time constant;

$\Delta a_{IB} \triangleq \Delta a_0$+scale factor and misalignment errors;

$\Delta g \triangleq$ Gravity deflections and anomaly ($v_xg$, $v_yg$, $\Delta g_z$)
G is 3×3 matrix defined as $$G = \begin{bmatrix} -g(0)/R^{[1]} & 0 & 0 \\ 0 & -g(0)/R^{[1]} & 0 \\ 0 & 0 & 2g(0)/R^{[2]} \end{bmatrix} \tag{18}$$

where R denotes the radius of the earth, and g(0) denotes gravity at zero height. [1] and [2] identify the specific terms affecting integrity. In particular, [1] identifies the two gravity terms responsible for Schuler feedback, and [2] identifies the gravity term responsible for the vertical gravity feedback. With an accurate gravity model that models the gravity anomalies and a good vertical accelerometer, the present invention makes it possible to compute the protection limit from only four pseudorange measurements, instead of the five required by previous methods.

Step 30 further requires the processor to retrieve pseudorange measurements from receiver 14 and determines the number of pseudoranges measurements N. After retrieving the pseudoranges, the processor determines N-element pseudorange residual vectors $\Delta\rho_0(k)$–$\Delta\rho_N(k)$, with the n-th pseudorange residual $\Delta\rho_n(k)$ defined as $$\Delta\rho_n(k) = \rho_{n,meas}(k) - \rho_{n,est}(k) \tag{19}$$

In this equation, $\rho_{n,meas}$ are the actual pseudorange measurements and $\rho_{n,est}(k)$ are the estimated pseudoranges based on the previous n-th absolute hybrid subsolution $r_n(k)$ and the receiver clock offset $\Delta tc_n$, with the subscript n denoting exclusion of the n-th pseudorange from the vector. The n-th absolute hybrid subsolution $r_n(k)$ refers to $$r_n(k) = r_i(k) + \Delta r_n^E(k) \tag{20}$$

where the supercript E denotes that the relative hybrid position solution $\Delta r_n$ has been transformed from the L frame to the earth-fixed frame for addition to the inertial position solution $r_i$. In short, $\rho_{n,est}(k)$ means those pseudoranges which would yield $r_n(k)$ as a position solution. Moreover, since $\rho_{n,est}(k)$ depends on the inertial position solution $r_i$ and the measured pseudoranges $\rho_{n,meas}$, $\Delta\rho_n(k)$ includes both inertial and pseudorange information.

Defining the pseudorange residual relative the previous solution establishes a dynamic reference trajectory for the solutions. Kalman filters that rely on this kind of iteratively updated residual are known as extended Kalman filters.

In this embodiment the Kalman filters include an error state for the altitude bias. Thus, in this step, the processor also determines a pressure altitude measurement residual based on the input pressure altitude from sensor 27 and the pressure altitude estimate based on the predicted altitude and the predicted pressure altitude bias. The predicted altitude stems from $r_n(k)$, as already defined. The altitude residual is defined the same for all the state vectors.

In step 40, the processor establishes the initial values for position solution $\Delta r_0(k)$ and subsolutions $\Delta r_1(k)$–$\Delta r_N(k)$, separation covariance matrices $dP_1(k)$–$dP_N(k)$ and error covariance matrices $P_1(k)$–$P_N(k)$, where k signifies their temporal correspondence to the k-th iteration.

In the preferred embodiment, step 40 also requires the processor to monitors changes in the number and composition of the satellites transmitters determining the position solution. If the number of satellites increase, the processor assigns a state vector (subfilter) and related variables to that satellite for processing along with the existing ones. And, if a satellite transmitter moves out of view or otherwise becomes unavailable, the processor decide when it can safely release its corresponding state vector $\Delta X_n$, that is, cease computing a particular subsolution $\Delta X_n$ and its associated discriminator $d_n$, separation parameter $D_n$, and error parameter $A_n$. Subsolution $\Delta X_n$ becomes unnecessary, and thus eligible for release, when the n-th satellite transmitter fails, moves out of view, or otherwise becomes irrelevant to the full position solution. To ensure that the remaining subsolutions remain unaffected by this failure, the processor delays the release until the remaining subsolutions have maintained their respective HDOPs (horizontal dilution of precision) below a threshold for a specific time period, such as five minutes.

As indicated in steps 50 and 60, the next steps entail computing the full solution $\Delta r_0(k)$ and subsolution $\Delta r_1(k)$–$\Delta r_N(k)$. However, in the Kalman implementation, these solutions depend on the Kalman gain vectors. Thus, as part of the computations for these solutions, the processor first determines Kalman gain vectors $g_0(k)$–$g_N(k)$ for updating all the states of corresponding hybrid state vectors $\Delta X_0$–$\Delta X_N$. Of course, updating these state vectors also updates corresponding solution $\Delta r_0(k)$ and subsolutions $\Delta r_1(k)$–$\Delta r_N(k)$. The n-th Kalman gain vector $g_n(k)$ is defined as $$g_n(k) = \frac{P_n(k)h_m}{h_m^T P_n(k)h_m + \sigma_{pr}^2} \tag{21}$$

In this relation, $\sigma_{pr}^2$ is the measurement noise variance and $h_m$ is a 1×18 measurement matrix, which selects the combinations of error states incorporated in the n-th measurement. $h_m$ is defined as $$h_m^T = [0_3 \ 0_3 \ -U_m \ 1 \ 0 \ 0_3 \ 0_3 \ 0] \tag{22}$$

where $0_3$ is a three-element zero vector and $U_m$ is a 3-element line-of-sight, or unit direction, vector pointing from the m-th transmitter to the user set (in L frame coordinates). The components of the line-of-sight vector are called direction cosines, in classical navigation geometry. Of course, the dimensions of h depend on the number of states in the Kalman filter.

In the Kalman gain equation, m ranges from 1 to N for $g_0$ and from 1, ..., n−1, n+1, ..., N, to exclude the n-th pseudorange measurement for $g_1$–$g_N$. This "m-loop" portion for determining the Kalman gain shows that this Kalman filter implementation follows a measurement-by-measurement approach, rather than a batch-processing approach. Although the two approaches are mathematically equivalent, the measure-by-measurement approach reduces the number of processor operations required for the Kalman filter calculations. Moreover, all the Kalman filter parameters with a measurement dependence (Eqs. 21–24, 30, and 33) are actually part of a single m-loop per solution, although for sake of clarity the m-loops are shown independently.

With the Kalman gain vectors, the processor can now update hybrid state vectors $\Delta X_0$–$\Delta X_N$ and thereby determine the position solutions $\Delta r_0(k)$–$\Delta r_N(k)$, as steps 50 and 60 require. The recursive updates follow:

$$\Delta X_0(k) = \Delta X_0(k) + g_0(k)[\Delta \rho_0(k)_m - h_m^T \Delta X_0(k)] \quad (23)$$

$$\Delta X_n(k) = \Delta X_n(k) + g_n(k)[\Delta \rho_n(k)_m - h_m^T \Delta X_n(k)] \quad (24)$$

where $\Delta \rho_n(k)$ is the mth element in the N-element column vector of pseudorange residuals defined, in step 30, as $$\Delta \rho_n(k) = \rho_{n,meas}(k) - \rho_{n,est}(k) \quad (25)$$

In Eq. 23, which defines the full or main Kalman filter, m ranges from 1 to N without omitting an pseudorange measurements, and in Eq. 24, which defines the Kalman subfilters, m ranges from 1, ..., n−1, n+1, ..., N, to exclude the n-th pseudorange measurement.

After updating the hybrid state vectors $\Delta X_0$–$\Delta X_N$, which include corresponding solutions $\Delta r_0(k)$–$\Delta r_N(k)$, the processor executes steps 70, 80, and 90, as in the first embodiment. In these steps, the processor determines discriminators $d_1$–$d_N$ and solution separation parameters $D_1$–$D_N$, and checks for satellite transmitter failures.

More particularly, step 70 requires the processor computes discriminators $d_1(k)$–$d_N(k)$ for the respective subsolutions $\Delta r_1$–$\Delta r_N$ from corresponding state vectors $\Delta X_1$–$\Delta X_N$. Like the first embodiment, this embodiment defines discriminators $d_1$–$d_N$ as the actual horizontal distance between the full solution $\Delta r_0$ and respective subsolutions $\Delta r_1$–$\Delta r_N$. This distance $d_n(k)$ between subsolution $\Delta r_n$ and full solution $\Delta r_0$ is $$d_n(k) = \sqrt{(\Delta r_0(N) - \Delta r_n(N))^2 + (\Delta r_0(E) - \Delta r_n(E))^2} \quad (26)$$

where (N) and (E) denote the north and east components of the full solution and the n-th subsolution.

In step 80, the processor determines the solution separation parameters $D_1$–$D_N$ for corresponding hybrid subsolutions $\Delta r_1(k)$–$\Delta r_N(k)$. As shown in substeps 80a–80c of FIG. 2A, step 80 requires the processor to compute separation covariance matrices $dP_1(k)$–$dP_N(k)$, to determine their corresponding maximum eigenvalues $\lambda_{dP1mx}$–$\lambda_{dPNmx}$, and finally to determine the separation parameters $D_1(k)$–$D_N(k)$ from $$D_n = \sqrt{\lambda_{dP_nmx}} \; Q^{-1}\left(\frac{P_{FD}}{2N}\right) \quad (27)$$

which, except for the k-notation, matches the definition in the first embodiment.

In contrast to the first embodiment, computing the separation covariance matrices $dP_1(k)$–$dP_N(k)$ follows a recursive update pattern. In other words, each k-th covariance matrix is based on the previous covariance matrix. Moreover, because of the hybrid implementation, these matrices are determined as part of a dual 18×18, or 36×36, partitionable covariance matrix $dP^2_n(k)$ with the form:

$$P_n^2(k) = \begin{bmatrix} P_0(k) & CC_n(k) \\ CC_n(k) & dP_n(k) \end{bmatrix} \quad (28)$$

where $P_0(k)$ is the 18×18 error covariance matrix for full solution $\Delta X_0(k)$, $dP_n(k)$ is the 18×18 separation covariance matrix for n-th separation "$\Delta X_0(k) - \Delta X_n(k)$" and $CC_n(k)$ is the cross correlation matrix of $\Delta X_0(k)$ and the n-th separation. The process updates this dual matrix according to $$P_n^2(k) = \phi_n(k) P_n^2(k) \phi_n(k)^T + \Gamma_n(k) \sigma_{pr}^2 \Gamma_n(k)^T \quad (29)$$

where $\phi_n(k)$ and $\Gamma_n(k)$ are respectively defined as $$\phi_n(k) = \begin{bmatrix} I - g_0 h_m^T & 0 \\ [g_n - g_0] h_m^T & I - g_n h_m^T \end{bmatrix} \quad (30)$$

and $$\Gamma_n(k) = \begin{bmatrix} g_0 \\ g_0 - g_n \end{bmatrix} \quad (31)$$

where I is the 18×18 identity matrix and m ranges from 1, ..., n−1, n+1, ..., N, to exclude the n-th pseudorange measurement. Note that the k-th iteration notations have been omitted from the Kalman gains $g_0$ and $g_n$ for clarity. The Kalman gains are defined in Eq. 21.

After updating the dual matrices $dP^2_1(k)$–$dP^2_N(k)$, the processor executes step 80b which entails determining the maximum position-domain eigenvalues of $dP_1(k)$–$dP_N(k)$. In step 80c, the process computes the solution separation parameters $D_1(k)$–$D_N(k)$, according to $$D_n(k) = \sqrt{\lambda_{dPnmx}(k)} \; Q^{-1}\left(\frac{P_{FD}}{2N}\right) \quad (32)$$

which, except for the k notation, is identical to the separation parameter of Eq. 7.

In step 90, the processor checks for transmitter failures by comparing the actual separations $d_1$–$d_N$ to respective solution separation parameters $D_1$–$D_N$. The solution separation parameters $D_1$–$D_N$ function as failure detection thresholds for the individual subsolutions. Thus, if the actual separation $d_n$ between subsolution $\Delta r_n$ and the full solution $\Delta r_0$ exceeds its respective separation parameter $D_n$, the processor sets a failure flag indicating detection of a transmitter failure.

In step 100, the processor determines subsolution error parameters parameters $A_1$–$A_N$. Like the first embodiment, this step entails substeps 100a–100c, shown in FIG. 2B. In particular, step 100a requires determining error covariance matrices $P_1(k)$–$P_N(k)$, which define the statistics of the corresponding subsolution errors. In this Kalman filter implementation, matrices $P_1(k)$–$P_N(k)$ follow the recursive relation $$P_n(k) = P_n(k) - g_n(k) h_m^T P_n(k) \quad (33)$$

where m ranges from 1, ..., n−1, n+1, ..., N, to exclude the n-th pseudorange measurement. $P_o(k)$ is also determined from this relation, except that m runs from 1 to N without excluding the n-th measurements.

After updating the error covariance matrices, the processor determines the error parameters $A_1-A_N$ from $$A_n(k) = \sqrt{\lambda_{nmax(k)}} \; Q^{-1}(P_{MD}) \tag{34}$$

Then, in step 110, the processor uses parameters $D_1-D_N$ and $A_1-A_N$ to compute the protection limit as $$\text{Integrity Limit}(k) = \max\{D_n(k) + A_n(k)\} \text{ over } n=1, N \tag{35}$$

which follows the same form as Eq. 13. However, because of the recursive derivation of the solutions $\Delta r_0-\Delta r_N$, and more particularly, the separation and error covariance matrices $dP^2_1(k)-dP^2_N(k)$ and $P_0(k)-P_N(k)$, the protection limit incorporates not only inertial data but also present and past measurement data.

In step 120, the processor outputs the position solution, the protection limit, and the failure flag to the flight management computer. The failure flag indicates the validity of the computed protection limit. If the failure flag is true, indicating a satellite transmitter failure, the computed protection limit is invalid. If the flag is false, the protection limit is valid and represents a true bound on the error of the position solution.

Then, to complete the k-th iteration, the processor projects, or propagates, forward one iteration as indicated in step 130. This entails determining the next, or $k+1^{th}$, hybrid state vectors $\Delta X_0(k+1)$ through $\Delta X_N(k+1)$ using $$\Delta X_n(k+1) = \Phi(k) \Delta X_n(k) \tag{36}$$

estimating the $k+1^{th}$ error covariance matrices $P_0(k+1)$ through $P_N(k+1)$ using $$P_n(k+1) = \Phi(k) P_n(k) \Phi(k)^T + Q(k) \tag{37}$$

In these relations, $\Phi(k)$ is the state transition matrix relating the k-th hybrid state vector to the next (k+1)-th estimate, according to the inertial dynamics defined by the linearized inertial error model of equations 15–17. And, Q(k) is the noise covariance matrix given by $$Q(k) = E[v(k)v(k)^T] \tag{38}$$

where v(k) is the process noise vector which defines the noise in the inertial measurements. Step 130 also entails determining the $k+1^{th}$ separation covariance matrices $P_1^2(k+1)$ through $P_N^2(k+1)$ using $$P_n^2(k+1) = \begin{bmatrix} \Phi(k) & 0 \\ 0 & \Phi(k) \end{bmatrix} P_n^2(k) \begin{bmatrix} \Phi(k)^T & 0 \\ 0 & \Phi(k)^T \end{bmatrix} + \begin{bmatrix} Q(k) & 0 \\ 0 & 0 \end{bmatrix} \tag{39}$$

After completing step 130, the process returns to step 30 to repeat the process entire loop shown in FIG. 4.

In sum, the second embodiment provides a simple Kalman-filter extension of the first embodiment, which incorporates not only inertial data but also present and past measurement data into the position solution and protection limit calculations and the transmitter failure detection. The past data effectively substitutes for any unavailable pseudorange measurement data that would otherwise prevent calculation of the protection limit, enabling the processor to compute the protection limit without interruption.

Moreover, the measurement exclusion mechanism in the subfilters ensures that at least one subfilter, that is, subsolution, remains immune to satellite failures or outages. Even if the failure occurs over a long time, the subfilter still provides a true reference for integrity monitoring. And, the incorporation of inertial data into the Kalman filters allows the integrity monitor to operate or coast through most, if not all, integrity holes arising from insufficient pseudorange measurements. In short, the second embodiment reduces the occurrence of integrity holes, thereby promoting the safety and reliability of navigation systems.

Although the present invention has been described with reference to preferred embodiments, workers skilled in the art will recognize that changes may be made in form and detail without departing from the spirit and scope of the invention. In particular, those in the art will recognize that a single processor could perform all the operations for implementing the invention or that multiple processors could share these operations. Moreover, the method itself could be divided over distinct functional unit other than those used for illustration here. Of course, other changes in form and detail are also within the spirit and scope of the invention as defined in the following claims.

What is claimed is:

1. A navigation system for a vehicle, comprising:

receiving means for mounting to the vehicle and for receiving a plurality of signals from a plurality of transmitters;

solution means for determining a position solution for the vehicle, based on the plurality of signals;

subsolution means for determining a plurality of position subsolutions for the vehicle, with each subsolution based on a respective subset of the plurality of signals;

solution separation means for determining a plurality of solution separation parameters, with each solution separation parameter based on statistics of a separation between the position solution and a respective subsolution; and error bound means for determining an error bound for the position solution, based on at least one of the solution separation parameters.

2. The system of claim 1 wherein the solution separation means determines each solution separation parameter from statistics of a horizontal separation between the position solution and the respective subsolution.

3. The system of claim I wherein the solution separation means determines each solution separation parameter from a respective covariance matrix describing the statistics of the separation between the position solution and the respective position subsolution.

4. The system of claim 3 wherein the solution separation means determines each solution separation parameter from the maximum eigenvalue of the respective covariance matrix.

5. The system of claim 4 wherein the solution separation means determines each solution separation parameter from $$\sqrt{\lambda_n} \; Q^{-1}\left(\frac{P_{FD}}{2N}\right)$$

where $\lambda_n$ represents the maximum eigenvalue of its respective covariance matrix, $Q^{-1}$ represents the inverse of a cumulative distribution function, $P_{FD}$ represents a preset probability of false detection, and N represents the number of signals in the plurality of signals.

6. The system of claim 1 including:

subsolution error means for determining a plurality of subsolution error parameters, with each error parameter based on error statistics of a respective position subsolution; and

15 wherein the error bound means determines the error bound from at least one of the solution separation parameters and at least one of the subsolution error parameters.

7. The system of claim 6 wherein the subsolution error means includes:

means for determining a plurality of error covariance matrices, with each error covariance matrix based on error statistics of the respective subsolution;

means for determining a respective maximum eigenvalue of each of the error covariance matrices; and wherein the subsolution error means determines each error parameter from the respective maximum eigenvalue and a preset probability of missed detection $P_{MD}$.

8. The system of claim 7 wherein the subsolution error means determines each error parameter from $$\sqrt{\lambda_n} \; Q^{-1}(P_{MD})$$

where $\lambda_n$ represents the respective maximum eigenvalue and $Q^{-1}$ represents the inverse of a cumulative distribution function.

9. The system of claim 6 wherein the error bound means includes:

means for determining a plurality of parameter sums, with each parameter sum including one of the solution separation parameters and one of the subsolution error parameters;

means for determining a maximum parameter sum from the plurality of parameter sums; and means for selecting the maximum sum as the error bound.

10. The system of claim 1 including:

detection mean for detecting a transmitter error based on at least one of the solution separation parameters.

11. The system of claim 10 wherein the detection means includes:

discriminator means for computing a plurality of discriminators, with each discriminator based on the position solution and a respective subsolution; and indicator means for indicating whether one of the discriminators is greater than one of the solution separation parameters.

12. The system of claim 11 wherein the discriminator means determines each discriminator from a distance between the position solution and the respective subsolution.

13. The system of claim 12 wherein the distance between the position solution and the respective subsolution is defined by $$\sqrt{(\Delta r_0(x) - \Delta r_n(x))^2 + (\Delta r_0(y) - \Delta r_n(y))^2}$$

where $\Delta r_0(x)$ and $\Delta r_0(y)$ denote respective horizontal components of the position solution, and $\Delta r_n(x)$ and $\Delta r_n(y)$ denote respective horizontal components of the respective subsolution.

14. The system of claim 1 including:

means for comparing the error bound to a maximum allowable error of the navigation system; and means for indicating if the error bound is not less than the maximum allowable error.

15. The system of claim 1:

wherein the solution means determines the position solution according to least-squares estimation; and wherein the subsolution means determines each position subsolution according to least-squares estimation.

16

16. The system of claim 1:

wherein the solution means determines the position solution from past and present values of the plurality of signals; and wherein the subsolution means determines each position subsolution from past and present values of its respective subset of the plurality of signals.

17. The system of claim 16:

wherein the solution means includes Kalman filtering means for determining the position solution from past and present values of the plurality of signals; and wherein the subsolution means includes Kalman filtering means for determining each position solution from past and present values of its respective subset of the plurality of signals.

18. The system of claim 17 including:

sensing means for sensing motion of the vehicle and providing motion data to the solution means and the subsolution means;

wherein the solution means determines the position solution from the motion data and past and present values of the plurality of signals; and wherein the subsolution means determines each position subsolution from the motion data and past and present values of its respective subset of the plurality of signals.

19. The system of claim 18 wherein the sensing means includes:

a plurality of accelerometers for providing acceleration data to the solution means and the subsolution means; and a plurality of gyroscopes for providing attitude data to the solution means and the subsolution means.

20. The system of claim 18 including:

an altimeter for providing altitude data to the solution means and to the subsolution means.

21. The system of claim 1 including:

sensing means for sensing motion of the vehicle and providing motion data to the solution means and the subsolution means;

wherein the solution means determines the position solution from the motion data and past and present values of the plurality of signals; and wherein the subsolution means determines each position subsolution from the motion data and past and present values of its respective subset of the plurality of signals.

22. The system of claim 1 wherein each of the plurality of transmitters orbits the earth.

23. A position measurement system for a vehicle, comprising:

receiving means for mounting to the vehicle and for receiving a plurality of signals from a plurality of transmitters;

solution means for determining a position solution for the vehicle, based on the plurality of signals;

subsolution means for determining a plurality of position subsolutions for the vehicle, with each subsolution based on a respective subset of the plurality of signals;

solution separation means for determining a plurality of solution separation parameters, with each solution separation parameter based on statistics of a separation between the position solution and a respective subsolution; and detection means for detecting a transmitter failure based on at least one of the solution separation parameters.

24. The system of claim 23 wherein the detection means includes:

discriminator means for computing a plurality of discriminators, with each discriminator based on the position solution and the respective subsolution; and indicator means for indicating whether one of the discriminators is not less than one of the solution separation parameters.

25. The system of claim 23 wherein the discriminator means determines each discriminator from a distance between the position solution and the respective subsolution.

26. The system of claim 25 wherein the distance between the position solution and the respective subsolution is defined by $$\sqrt{(\Delta r_0(x) - \Delta r_n(x))^2 + (\Delta r_0(y) - \Delta r_n(y))^2}$$

where $\Delta r_0(x)$ and $\Delta r_0(y)$ denote respective horizontal components of the position solution, and $\Delta r_n(x)$ and $\Delta r_n(y)$ denote respective horizontal components of the subsolution.

27. The system of claim 23 wherein the solution separation means determines each solution separation parameter from a respective covariance matrix describing the statistics of the separation between the position solution and the respective position subsolution.

28. The system of claim 27 wherein the solution separation means determines each solution separation parameter from the maximum eigenvalue of the respective covariance matrix.

29. The system of claim 28 wherein the solution separation means determines each solution separation parameter from $$\sqrt{\lambda_n} \; Q^{-1}\left(\frac{P_{FD}}{2N}\right)$$

where $\lambda_n$ represents the maximum eigenvalue of its respective covariance matrix, $Q^{-1}$ represents the inverse of a cumulative distribution function, $P_{FD}$ represents a preset probability of false detection, and N represents the number of signals in the plurality of signals.

30. The system of claim 23 including:
subsolution error means for determining a plurality of subsolution error parameters, with each error parameter based on error statistics of a respective position subsolution; and
error bound means for determining an error bound for the position solution based on one of the solution separation parameters and one of the subsolution error parameters.

31. A method of operating and monitoring a position measurement system for a vehicle, the method comprising:
determining a position solution for the vehicle, based on a plurality of signals from a plurality of transmitters;
determining a position subsolution for the vehicle, based on a subset of the plurality of signals;
determining a solution separation parameter from statistics of a separation between the position solution and the position subsolution;
determining a discriminator based on the position solution and the position subsolution;
detecting a transmitter failure based on the relationship of the discriminator and the solution separation parameter.

32. The method of claim 31 including:
determining an error bound for the position solution, based on the solution separation parameter;
comparing the error bound to a maximum allowable error; and
indicating an accuracy failure if the error bound is not less than the maximum allowable error.

33. The method of claim 31 wherein:
the discriminator is based on a distance between the position solution and the subsolution; and
a transmitter failure is detected if the discriminator is not less than the solution separation parameter.

34. The method of claim 33 wherein the distance between the position solution and the respective subsolution is defined by $$\sqrt{(\Delta r_0(x) - \Delta r_n(x))^2 + (\Delta r_0(y) - \Delta r_n(y))^2}$$

where $\Delta r_0(x)$ and $\Delta r_0(y)$ denote respective horizontal components of the position solution, and $\Delta r_n(x)$ and $\Delta r_n(y)$ denote respective horizontal components of the respective subsolution.

35. The method of claim 31 wherein the solution separation parameter is determined from an eigenvalue of a covariance matrix describing the statistics of the separation between the position solution and the position subsolution.

36. The method of claim 35 wherein the solution separation parameter is determined from $$\sqrt{\lambda_n} \; Q^{-1}\left(\frac{P_{FD}}{2N}\right)$$

where $\lambda_n$ represents the maximum eigenvalue of the covariance matrix, $Q^{-1}$ represents the inverse of a cumulative distribution function, $P_{FD}$ represents a preset probability of false detection, and N represents the number of signals in the plurality of signals.

37. The method of claim 32 wherein determining the error bound includes:
determining an error parameter from error statistics of the position subsolution; and
adding the error parameter to the solution separation parameter to determine the error bound.

38. The method of claim 37 wherein the error parameter is determined from a maximum eigenvalue of a covariance matrix describing the error statistics of the position subsolution.

39. The method of claim 38 wherein the error parameter is determined from $$\sqrt{\lambda_n} \; Q^{-1}(P_{MD})$$

where $\lambda_n$ represents the maximum eigenvalue, $Q^{-1}$ represents the inverse of a cumulative distribution function, and $P_{MD}$ represents a preset probability of missed detection.

40. The method of claim 31 wherein:
determining the position solution includes Kalman filtering past and present values of the plurality of signals; and
determining the position subsolution includes Kalman filtering past and present values of the its respective subsets of the plurality of signals.

41. The method of claim 40 wherein:
the position solution is determined from vehicle motion data and past and present values of the signals; and
the position subsolution is determined from vehicle motion data and past and present values of the subset of signals.

42. The method of claim 41 wherein the motion data includes acceleration data and attitude data for the vehicle.

43. The method of claim 40 wherein the position solution is also determined from altimeter data and the position solution is also determined from altimeter data.

* * * * *